UNITED STATES PATENT OFFICE.

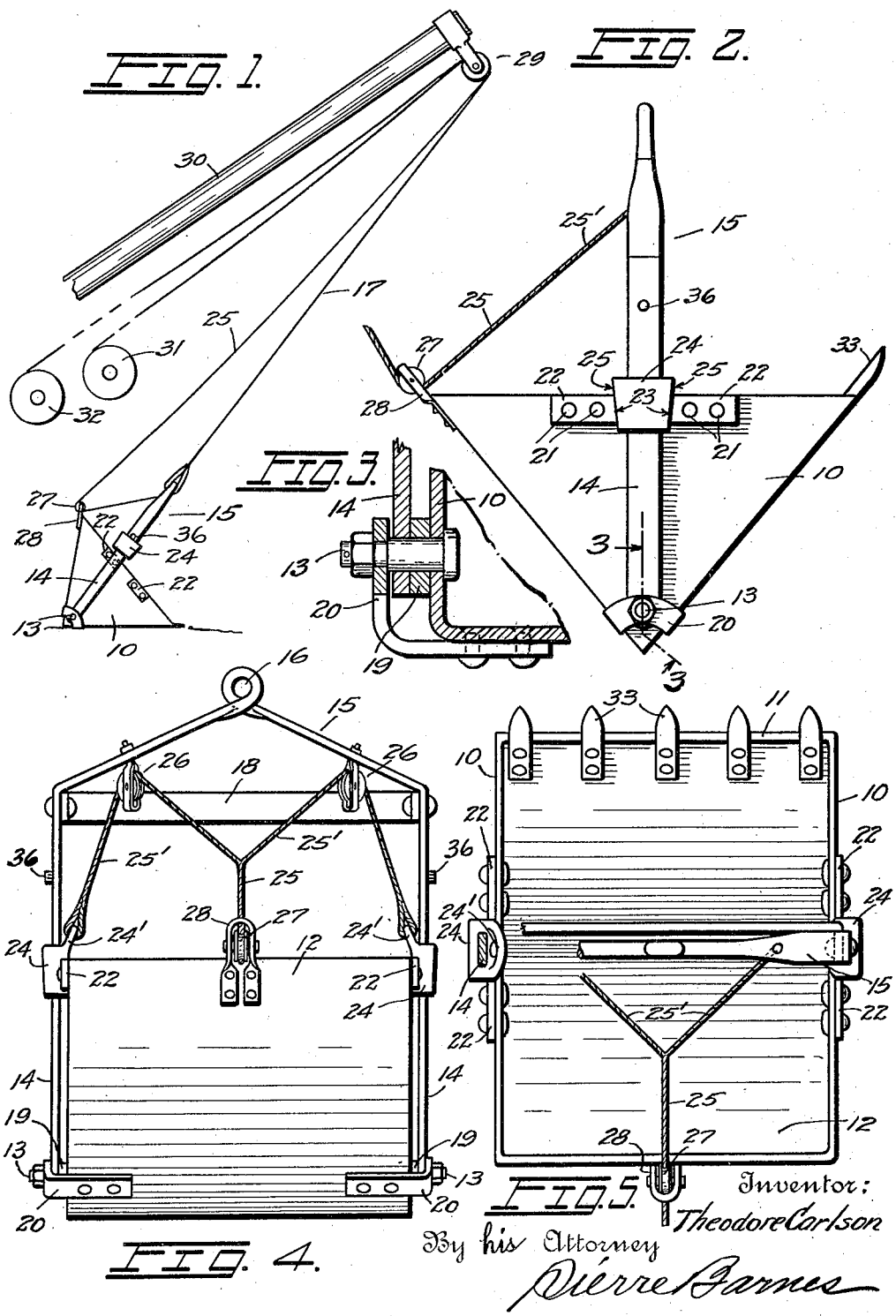

THEODORE CARLSON, OF STILLWATER, WASHINGTON.

EXCAVATING AND HOISTING APPARATUS.

1,387,042.  Specification of Letters Patent.  Patented Aug. 9, 1921.

Application filed June 29, 1920. Serial No. 392,760.

*To all whom it may concern:*

Be it known that I, THEODORE CARLSON, a citizen of the United States, residing at Stillwater, in the county of King and State of Washington, have invented certain new and useful Improvements in Excavating and Hoisting Apparatus, of which the following is a specification.

This invention relates to excavating apparatus; and its principal object is the provision of devices of this character whereby the operations of digging, hoisting and dumping material may be most conveniently effected and controlled through the instrumentality of two ropes from suitable operating means.

The invention is illustrated in the accompanying drawings, in which—

Figure 1 is a side elevational view showing my improved scraper in digging position and its connections with a derrick boom and cable drums by which the scraper is operated. Fig. 2 is a side elevation of the scraper in its hoisting position.

Fig. 3 is a detail sectional view through 3—3 of Fig. 2. Fig. 4 is a rear end elevation of Fig. 2. Fig. 5 is a plan view of the same, part of the bail being broken away.

In the present invention the scraper pan is, by preference, of a substantially triangular shape in longitudinal vertical section and of a substantially rectangular shape in horizontal section. The pan is accordingly constructed with triangular side walls 10 and inclined front and back walls 11 and 12. Pivotally connected by means of bolts 13 to the lower portions of the side walls are the lower ends of legs 14 of a bail 15 which spans the pan and is provided with an eye 16 for a rope 17 (Fig. 1) which serves for both dragging and hoisting purposes. The legs 14 of said bail are maintained at somewhat greater distances apart than the width of the pan by means of a spreader 18 above the pan and at the pivotal connection by an apertured piece 19, see Fig. 3, interposed between each bail leg and the adjacent side wall. 20 represents stirrup pieces secured to the bottom of the pan for the purpose of supporting the outer ends of the respective bolts 13.

Secured as by rivets 21 to the upper portion of each side wall 10 of the pan is a pair of plates 22. The plates of each pair are disposed in spaced relations, as best shown in Fig. 2 and have, desirably, their opposing ends 23 inclined to afford an angular shaped recess therebetween.

Sleeved upon each of the bail legs is an apertured block or collar 24 having its front and back sides 25 sloped to correspond with the inclinations of the plate ends 23 when the bail is in rectangular relations to the pan. When engaged in the spaces between the plates 22 the collars 24 serve to secure the bail to the pan as shown in Fig. 2. When the collars are withdrawn from such spaces the pan is free to tilt in one longitudinal direction or the other subject, however, to the action of the pan tilting rope 25 after the latter has elevated the collars against the stop studs 36 which protrude from the bail legs.

The tilting rope 25 is provided with branches $25^1$ which extend through guide pulleys 26 depending from the bail (Fig. 4) and are connected to apertured ear elements $24^1$ of the respective collars.

The tilting rope 25 passes about a sheave 27 connected by an attachment 28 to the back wall 12 of the pan. From this sheave 27 the tilting rope 25 is led about a sheave in pulley 29 at the outer end of a derrick boom 30 to a winding drum 31. The aforesaid rope 17 from the bail also passes about a sheave in said pulley to a second winding drum 32.

The winding drums 31 and 32 are designed to be driven by power means (not shown) and are controlled by any well known or suitable brake devices to regulate the unwinding of the drums.

To facilitate digging operations the upper edge of the front wall 11 is advantageously equipped with cutting teeth 33.

By suitably controlling the drums 31 and 32 the apparatus is regulated and operated as follows: When a pull is exercised on the rope 25 independently of or to a greater extent than the cable 17 the collars 24 are withdrawn from engagement with the pan plates 22 and against the stops 36 the rope 25 acting through the agency of the sheave 27 which is attached to the pan back 12 then serves to tilt the pan forward into digging position as shown in Fig. 1, whereupon, both drums 31 and 32 are operated simultaneously to wind the cable and rope thereupon to the same extent to cause the pan to be drawn forward to excavate material and load the same into the pan.

When the pan is thus loaded the rope 25 is slacked to allow the collars 24 to be lowered into the spaces between the respective pairs of plates 22.

With the collars thus engaged the cable 17 is used alone to elevate the loaded pan which may be swung with the boom and tilted by means of the rope 17 subsequent to the latter's being employed to disengage the collars.

What I claim is,—

1. In apparatus of the character described, the combination of a scraper pan, a bail pivotally connected thereto adjacent to the pan bottom, a collar sleeved on each of the legs of said bail, means engageable with the respective collars provided on the sides of the pan and adjacent to its top, a sheave attached to the ear end of the pan, sheaves depending from the bail above the pan, a tilting rope extending about the first named sheave and having branches extending about the respective second named sheaves and secured to said collars for disengaging the latter from said means, means provided upon the legs of said bail to serve as stops for the respective collars, and a pan-hoisting rope secured to the bail.

2. In apparatus of the character described, the combination of a scraper pan, a bail having its legs pivotally connected to the sides of the pan, socket devices provided upon the upper portion of the pan sides, pan locking elements connected to the bail legs for longitudinal movements thereon and engageable in said socket devices for releasably securing the pan to the bail in hoisting relations, stops provided on the legs for limiting the movements of said elements away from the pivoted connections of the legs with the pan, a pan-hoisting rope secured to said bail, a pan tilting rope connected with the back end of the pan and also with said locking elements and means for guiding said tilting rope whereby the latter serves to successively release said locking elements from the pan and effect the tilting of the pan for dumping a load therefrom, said tilting rope also serving with the hoisting rope to maintain the pan in operative position for excavating material.

Signed at Seattle, Washington, this 21st day of June 1920.

THEODORE CARLSON.

Witnesses:
 PIERRE BARNES,
 MARGARET G. TUPPLE.